April 7, 1925.                H. W. ROSE ET AL                1,532,953
SCREW DRIVER
Filed Feb. 6, 1923
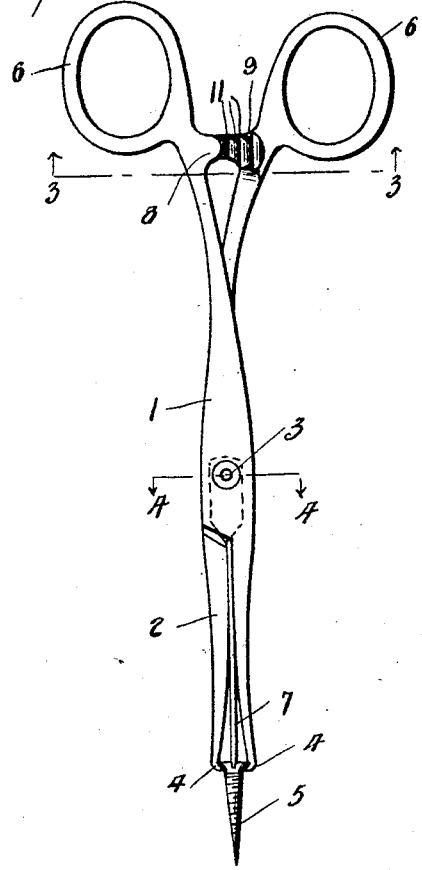
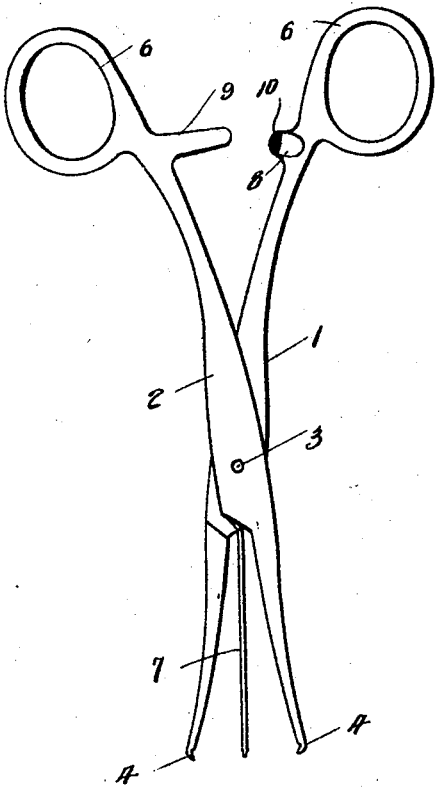
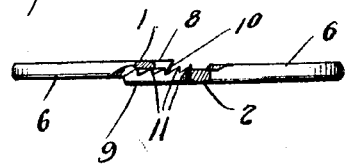
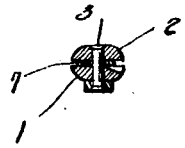
Inventor
H. W. Rose + J. O. Hicks.
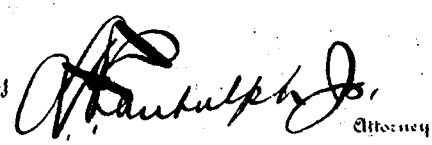

Patented Apr. 7, 1925.

1,532,953

UNITED STATES PATENT OFFICE.

HENRY W. ROSE AND JAMES O. HICKS, OF VICTORIA, TEXAS.

SCREW DRIVER.

Application filed February 6, 1923. Serial No. 617,311.

*To all whom it may concern:*

Be it known that we, HENRY W. ROSE and JAMES O. HICKS, citizens of the United States, residing at Victoria, in the county of Victoria and State of Texas, have invented certain new and useful Improvements in Screw Drivers; and we do hereby declare the following to be a full, clear, and exact description of the invention, such as will enable others skilled in the art to which it appertains to make and use the same.

The present invention has for its object the provision of a screw driver which admits of the holding of a screw when placing the same in position or removing the same from a place difficult of access, the tool being of such construction as to admit of its ready engagement with or disengagement from the screw.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application—

Figure 1 is an elevation of a screw driver embodying the invention, showing the relation of the parts when holding or gripping a screw, Figure 2 is a reverse side view of the tool, the members being spread, Figure 3 is a section on the line 3—3 of Figure 1, and Figure 4 is a sectional detail on the line 4—4 of Figure 1.

Corresponding and like parts are referred to in the following description and designated in the several views of the drawings by like reference characters.

The tool comprises similar members 1 and 2 which cross and are pivoted at the point of crossing, as indicated at 3. The gripping ends of the members 1 and 2 terminate in nibs 4 which are inwardly deflected so as to grip opposite sides of the head of a screw 5, as indicated most clearly in Figure 1. The opposite ends of the members 1 and 2 terminate in eyes 6 which are adapted to receive the thumb and finger of the hand in substantially the same manner as the blades of a pair of scissors or shears. A blade 7 is disposed between the jaws of the members 1 and 2 and is mounted upon pivots 3. The blade 7 constitutes the driver proper and is of such relative length that its point terminates short of the nibs 4, whereby, in practice, when the point of the blade 7 enters the slot in the head of the screw, the nibs 4 grip opposite sides of the head, whereby to retain the screw in place, as indicated most clearly in Figure 1.

A ratchet mechanism is provided to hold the members in closed position, the same consisting of inner projections 8 and 9, the projection 8 terminating in a lateral tooth 10, and the projection 9 being formed on the side facing the projection 8 with a plurality of teeth 11 to coact with the tooth 10 whereby to hold the members 1 and 2 when closed. When closing the members, the tooth 10 rides over the teeth 11 and engages with a selected tooth 11 and retains the members 1 and 2 in the required adjusted position. The members 1 and 2 are released by a relative lateral movement of the eyes 6 which separate the tooth 10 from the teeth 11.

What is claimed is:

A tool of the class described consisting of relatively movable crossing levers forming opposed jaws to jointly engage a screw at their work ends, a pivot connecting said levers, a thin flat driver blade having a first and a second portion, said portions being disposed at substantially a right angle to each other, the first mentioned portion lying flatwise between the levers at the crossing and being pivotally secured in place between the levers by said pivot for movement independently of each of the levers, and the second mentioned portion being disposed flatwise between the jaw portions of the levers and at its distal end adapted to enter the kerf of a screw.

In testimony whereof we affix our signatures in presence of two witnesses.

HENRY W. ROSE.
JAMES O. HICKS.

Witnesses:
LEE NORA VOGLE,
L. A. FINEBLE.